(12) United States Patent
Messina et al.

(10) Patent No.: US 9,371,943 B2
(45) Date of Patent: Jun. 21, 2016

(54) PROCESS FOR LINING METAL PIPELINES

(75) Inventors: Nicasio Messina, Zerbolo (IT); Marco Mirenda, Rho (IT); Giambattista Besana, Mariano Comense (IT); Julio A. Abusleme, Saronno (IT); Régis Faig, Baverans (FR)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 14/122,652

(22) PCT Filed: May 25, 2012

(86) PCT No.: PCT/EP2012/059910
§ 371 (c)(1),
(2), (4) Date: Nov. 26, 2013

(87) PCT Pub. No.: WO2012/163858
PCT Pub. Date: Dec. 6, 2012

(65) Prior Publication Data
US 2014/0083550 A1 Mar. 27, 2014

(30) Foreign Application Priority Data

Jun. 1, 2011 (EP) .................................... 11168546

(51) Int. Cl.
*F16L 9/19* (2006.01)
*B29C 63/18* (2006.01)
*F16L 9/147* (2006.01)
*F16L 55/165* (2006.01)
*F16L 58/10* (2006.01)

(52) U.S. Cl.
CPC . *F16L 9/19* (2013.01); *B29C 63/18* (2013.01); *F16L 9/147* (2013.01); *F16L 55/165* (2013.01); *F16L 58/10* (2013.01)

(58) Field of Classification Search
CPC .................................. F16L 9/19; B29C 63/18
USPC ......................... 405/184.2; 264/573; 138/114
See application file for complete search history.

(56) References Cited

U.S. PATENT DOCUMENTS

| 3,541,039 | A | 11/1970 | Whiton |
|---|---|---|---|
| 4,355,664 | A | 10/1982 | Cook et al. |
| 4,584,215 | A | 4/1986 | Bre et al. |
| 4,706,713 | A | 11/1987 | Sadamitsu et al. |
| 5,429,849 | A | 7/1995 | Lasson et al. |
| 6,271,294 | B1 | 8/2001 | Lasson et al. |
| 6,455,118 | B1 | 9/2002 | Dewimille et al. |
| 2003/0116251 | A1 | 6/2003 | Allmann et al. |
| 2004/0054050 | A1 | 3/2004 | Pascal et al. |
| 2005/0229992 | A1 | 10/2005 | McKeen et al. |
| 2009/0124748 | A1 | 5/2009 | Baert et al. |

FOREIGN PATENT DOCUMENTS

| DE | 4109663 A1 | 9/1992 |
|---|---|---|
| EP | 65886 A1 | 12/1982 |
| EP | 1375588 A1 | 1/2004 |
| FR | 2935706 A1 | 3/2010 |
| GB | 2244781 A | 12/1991 |
| GB | 2298689 A | 9/1996 |
| GB | 2318399 A | 4/1998 |
| WO | 2007122217 A1 | 11/2007 |

OTHER PUBLICATIONS

Alger Mark S.M., "Polymer Science Dictionary", 1989, London School of Polymer Technology, Polytechnic of North London, UK published by Elsevier Applied Science, p. 476.

*Primary Examiner* — Tara M. Pinnock

(57) ABSTRACT

A process for lining a metal pipeline, which process generally utilizes thermoplastic fluoropolymer pipe liner Also, a pipeline system that includes at least two coaxial pipes, an outer metal pipe and inner thermoplastic fluoropolymer pipe. The thermoplastic fluoropolymer pipe/pipe liner is made from a composition that generally includes from 10% to 60% by weight of at least one vinylidene fluoride (VDF) homopolymer, from 40% to 90% by weight of at least one VDF copolymer comprising from 2% to 15% by moles of recurring units derived from at least one other fluorinated comonomer (F), and optionally at least one plasticizer.

20 Claims, No Drawings

PROCESS FOR LINING METAL PIPELINES

This application is a U.S. national stage entry under 35 U.S.C. §317 of International Application No. PCT/EP2012/059910 filed May 25, 2012, claims priority to European Application No. 11168546.7, filed Jun. 1, 2011. The entire contents of these applications are explicitly incorporated herein by this reference.

TECHNICAL FIELD

The present invention pertains to a process for lining metal pipelines using a thermoplastic fluoropolymer pipe liner and to a pipeline system comprising at least two coaxial pipes, an outer metal pipe and an inner thermoplastic fluoropolymer pipe.

BACKGROUND ART

Fluorocarbon resins, in particular vinylidene fluoride resins, are endowed with outstanding mechanical properties within a broad range of temperature, excellent resistance to high temperature, organic solvents and to various chemically aggressive environments.

Thanks to their properties, they are commonly used for manufacturing articles by extrusion or injection molding, e.g. for producing pipes, tubes, fittings, films, coatings, cable sheathings, flexible pipes and the like.

In particular, off-shore pipelines such as those used to pump oil and gas ashore from off-shore drilling rigs and terminals are required to be capable of withstanding very high internal pressures and temperatures and are therefore typically made of metals such as iron and steel.

However, among major issues encountered with steel pipelines in general and off-shore pipelines in particular is the problem of corrosion.

In order to protect the inner bore of the pipelines from the corrosive effects of materials passing through them, such as mixtures of hydrocarbons, water and other contaminants, e.g. carbon dioxide and hydrogen sulphide, it has been already proposed to provide a liner made of a suitable polymeric material.

In order to be able to install a liner in an existing steel pipeline, the liner either needs to be considerably under-sized with respect to the pipeline, in which case the long term stability and integrity of the liner would be compromised, or the liner needs to be capable of being installed in a contracted form and then expanded to full or nearly full size to fit with the pipeline.

High density polyethylene has long been used for liners in land-based pipelines carrying mains water. However, polyethylene is not suitable for use in harsh chemical environments.

Polyvinylidene fluoride (PVDF) has also been proposed as a liner material for hydrocarbon pipelines on account of its resistance to hydrocarbons and other associated pipeline fluids at temperatures of up to 130° C. or more.

For instance, multilayer pipes are known in the art which are suitable for use as liners in off-shore oil and gas pipelines such as those described in GB 2318399 (GLYNWED PIPE SYSTEMS LIMITED) 22 Apr. 1998, said multilayer pipes comprising a barrier layer formed from a first polyvinylidene fluoride material and a structural layer formed from a second polyvinylidene fluoride material, the barrier layer being thinner than the structural layer.

Also, US 2005/0229992 (E.I. DU PONT DE NEMOURS AND CO.) 20 Oct. 2005 discloses a process for lining the interior surface of a pipe for conveying chemicals, especially an oil pipe, wherein a tubular line made from a fluoropolymer, said tubular line having an outer diameter greater than the interior diameter of the pipe, is mechanically reduced, inserted in the pipe and expanded into tight engagement with the primer layer or barrier layer, if present, of the interior surface of the pipe. Non-limitative examples of fluoropolymers suitable for manufacturing the tubular liner include, notably, PVDF homopolymers and blends of PVDF homopolymers with acrylic polymers.

Further, pipes made of blends of vinylidene fluoride (VDF) based polymers are described in EP 1375588 A (ATOFINA CHEMICALS INC.) 2 Jan. 2004 which are notably suitable for use as pipe liners with improved stress resistance. However, no mention is made therein of a process for lining or relining pipelines wherein the pipe liner is installed in a contracted form and then expanded to its full or nearly full size to fit with the pipeline.

There is thus still a need in the art for a solid-wall pipe liner endowed with suitable mechanical properties to be successfully installed in oil and gas metal pipelines in a contracted form and then expanded to its full or nearly full size to fit with the pipeline, without cracking or fracturing of the pipe, while being resistant to heat and pressure and to harsh chemical environments in the long term.

SUMMARY OF INVENTION

It is thus an object of the present invention a process for lining a metal pipeline, said process comprising the following steps:

(i) processing a thermoplastic fluoropolymer composition to yield a pipe liner having an outer diameter greater than the inner diameter of said metal pipeline, said thermoplastic fluoropolymer composition comprising:

(A) from 10% to 60% by weight, preferably from 25% to 55% by weight, more preferably from 30% to 40% by weight based on the total weight of polymer (A) and polymer (B) of at least one vinylidene fluoride (VDF) homopolymer [polymer (A)], (B) from 40% to 90% by weight, preferably from 45% to 75% by weight, more preferably from 60% to 70% by weight based on the total weight of polymer (A) and polymer (B) of at least one VDF copolymer comprising from 2% to 15% by moles of recurring units derived from at least one other fluorinated comonomer (F) [polymer (B)], and optionally, (C) at least one plasticizer;

(ii) deforming said pipe liner to yield a deformed pipe liner having an outer diameter smaller than the inner diameter of said metal pipeline;

(iii) introducing the deformed pipe liner in said metal pipeline; and (iv) expanding the deformed pipe liner to fit with the inner diameter of said metal pipeline.

It has been surprisingly found that the pipe liner made of the composition of the process of the invention is a solid-wall pipe endowed with a combination of mechanical properties that make it suitable for successfully lining oil and gas metal pipelines, commonly operating at high temperatures and pressures, while also protecting said metal pipelines from corrosive effects of harsh materials passing through them.

The process of the invention advantageously ensures that the pipe liner is fitted in firm contact with the metal pipeline.

The metal pipeline of the process of the invention is usually an iron or steel pipeline, preferably a steel pipeline, more preferably a carbon, alloy or stainless steel pipeline.

The pipe liner of the process of the invention is particularly suitable for lining metal pipelines conveying hydrocarbons at temperatures of up to 130° C. or more, such as on-shore and off-shore metal pipelines, preferably off-shore oil and gas metal pipelines.

The pipe liner of the process of the present invention is advantageously endowed with a yield strain higher than 10%, preferably higher than 11%, more preferably higher than 12%, as measured in accordance with ISO 527-2.

The pipe liner of the process of the present invention is advantageously endowed with a yield strain lower than 25%, preferably lower than 24%, more preferably lower than 23%, as measured in accordance with ISO 527-2.

According to an embodiment of the process of the invention, the metal pipeline may be an existing damaged metal pipeline. Should the metal pipeline be an existing damaged metal pipeline, the lining process of the invention is a lining rehabilitation process.

In step (i) of the process of the invention, the term "thermoplastic" is understood to mean, for the purposes of the present invention, a fluoropolymer composition existing, at room temperature, below its glass transition temperature, if it is amorphous, or below its melting point if it is semi-crystalline, and which is linear (i.e. not reticulated). This fluoropolymer composition has the property of becoming soft when it is heated and of becoming rigid again when it is cooled, without there being an appreciable chemical change. Such a definition may be found, for example, in the encyclopedia called "Polymer Science Dictionary", Mark S. M. Alger, London School of Polymer Technology, Polytechnic of North London, UK, published by Elsevier Applied Science, 1989.

By the term "vinylidene fluoride (VDF) homopolymer [polymer (A)]" it is hereby intended to denote a polymer comprising recurring units derived from VDF and, optionally, up to 1.5% by moles of recurring units derived from at least one other fluorinated comonomer (F).

The intrinsic viscosity of polymer (A) is advantageously comprised between 0.9 dl/g and 2.0 dl/g, preferably between 1.1 dl/g and 1.3 dl/g, more preferably between 1.15 dl/g and 1.25 dl/g.

The intrinsic viscosity ($\eta$) of polymer (A) is measured at 25° C. by dissolving polymer (A) in N,N-dimethylformamide at a concentration of about 0.2 g/dl using a Ubbelhode viscosimeter according to the following equation:

$$\eta = \frac{\eta_{sp} + \Gamma \cdot \ln \eta_r}{(1+\Gamma) \cdot c}$$

wherein:
c is polymer concentration in g/dl;
$\eta_r$ is the relative viscosity, i.e. the ratio between the dropping time of sample solution and the dropping time of solvent;
$\eta_{sp}$ is the specific viscosity, i.e. $\beta_r-1$;
$\Gamma$ is an experimental factor, which for polymer (A) corresponds to 3.

The melting point of polymer (A) is advantageously at least 165° C. and at most 180° C., as measured by Differential Scanning Calorimetry (DSC) according to ASTM D 3418.

The polymer (A) of the thermoplastic fluoropolymer composition of the process of the invention preferably consists of recurring units derived from VDF.

Representative examples of most preferred polymers (A) are commercially available under the trademark names SOLEF® and KYNAR®.

The vinylidene fluoride (VDF) copolymer (B) of the thermoplastic fluoropolymer composition of the process of the invention preferably comprises:
at least 60% by moles, preferably at least 75% by moles, more preferably at least 85% by moles of recurring units derived from VDF, and
from 2% to 15% by moles, preferably from 2.5% to 12% by moles, more preferably from 3% to 10% by moles of at least one other fluorinated comonomer (F).

By the term "fluorinated comonomer [comonomer (F)]", it is hereby intended to denote an ethylenically unsaturated comonomer comprising at least one fluorine atom.

Non-limitative examples of suitable fluorinated comonomers (F) include, notably, the followings:
(a) $C_2$-$C_8$ fluoro- and/or perfluoroolefins such as tetrafluoroethylene (TFE), hexafluoropropylene (HFP), pentafluoropropylene and hexafluoroisobutylene;
(b) $C_2$-$C_8$ hydrogenated monofluoroolefins such as vinyl fluoride, 1,2-difluoroethylene and trifluoroethylene;
(c) perfluoroalkylethylenes of formula $CH_2=CH-R_{f0}$, wherein $R_{f0}$ is a $C_1$-$C_6$ perfluoroalkyl group;
(d) chloro- and/or bromo- and/or iodo-$C_2$-$C_6$ fluoroolefins such as chlorotrifluoroethylene (CTFE);
(e) (per)fluoroalkylvinylethers of formula $CF_2=CFOR_{f1}$, wherein $R_{f1}$ is a $C_1$-$C_6$ fluoro- or perfluoroalkyl group, e.g. $-CF_3$, $-C_2F_5$, $-C_3F_7$;
(f) (per)fluoro-oxyalkylvinylethers of formula $CF_2=CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;
(g) fluoroalkyl-methoxy-vinylethers of formula $CF_2=CFOCF_2OR_{f2}$, wherein $R_{f2}$ is a $C_1$-$C_6$ fluoro- or perfluoroalkyl group, e.g. $-CF_3$, $-C_2F_5$, $-C_3F_7$ or a $C_1$-$C_6$ (per)fluorooxyalkyl group having one or more ether groups, e.g. $-C_2F_5-O-CF_3$;
(h) fluorodioxoles of formula:

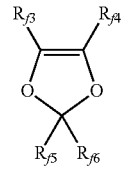

wherein each of $R_{f3}$, $R_{f4}$, $R_{f5}$ and $R_{f6}$, equal to or different from each other, is independently a fluorine atom, a $C_1$-$C_6$ fluoro- or per(halo)fluoroalkyl group, optionally comprising one or more oxygen atoms, e.g. $-CF_3$, $-C_2F_5$, $-C_3F_7$, $-OCF_3$, $-OCF_2CF_2OCF_3$.

The polymer (B) of the thermoplastic fluoropolymer composition of the process of the invention is preferably a VDF copolymer comprising from 2% to 15% by moles recurring units derived from hexafluoropropylene (HFP) and/or chlorotrifluoroethylene (CTFE).

Representative examples of most preferred polymers (B) are commercially available under the trademark names SOLEF® and KYNARFLEX®.

Very good results have been obtained with a thermoplastic fluoropolymer composition wherein the polymer (B) is a VDF copolymer comprising from 2% to 15% by moles of recurring units derived from hexafluoropropylene (HFP).

The intrinsic viscosity of polymer (B) is advantageously comprised between 0.9 dl/g and 2.0 dl/g, preferably between 1.5 dl/g and 1.8 dl/g, more preferably between 1.55 dl/g and 1.7 dl/g.

The intrinsic viscosity (η) of polymer (B) is measured at 25° C. by dissolving polymer (B) in N,N-dimethylformamide at a concentration of about 0.2 g/dl using a Ubbelhode viscosimeter according to the following equation:

$$\eta = \frac{\eta_{sp} + \Gamma \cdot \ln\eta_r}{(1+\Gamma)\cdot c}$$

wherein:
c is polymer concentration in g/dl;
$\eta_r$ is the relative viscosity, i.e. the ratio between the dropping time of sample solution and the dropping time of solvent;
$\eta_{sp}$ is the specific viscosity, i.e. $\eta_r-1$;
$\Gamma$ is an experimental factor, which for polymer (B) corresponds to 3.

The melting point of polymer (B) is advantageously at least 140° C. and at most 170° C., as measured by Differential Scanning Calorimetry (DSC) according to ASTM D 3418.

The Applicant has surprisingly found that by combining polymer (A) and polymer (B) as defined above in a weight ratio of from 10:90 to 60:40, preferably of from 25:75 to 55:45, more preferably of from 30:70 to 40:60 so as to obtain the thermoplastic fluoropolymer composition of the process of the invention, it is possible to take advantage of an unexpected synergistic effect which enables obtaining a long term durable solid-wall pipe liner which can be successfully used in the process of the invention for lining metal pipelines commonly conveying oils and gases.

It is essential that the thermoplastic fluoropolymer composition of the process of the invention comprises from 10% to 60% by weight based on the total weight of polymer (A) and polymer (B) of at least one polymer (A) as defined above and from 40% to 90% by weight based on the total weight of polymer (A) and polymer (B) of at least one polymer (B) as defined above.

When the thermoplastic fluoropolymer composition of the process of the invention comprises less than 10% by weight based on the total weight of polymer (A) and polymer (B) of said polymer (A), the composition so obtained is endowed with yield strain values such that the pipe liner obtained therefrom behaves predominantly in an elastic manner and will thus not retain its diameter reduction after deformation of the pipe liner so that it cannot be advantageously used in the process of the invention.

When the thermoplastic fluoropolymer composition of the process of the invention comprises more than 60% by weight based on the total weight of polymer (A) and polymer (B) of said polymer (A), the composition so obtained is endowed with yield strain values such that the pipe liner obtained therefrom behaves predominantly in a plastic manner and will be thus permanently plastically deformed so that it cannot be advantageously used in the process of the invention.

The thermoplastic fluoropolymer composition of the process of the invention may comprise at least one plasticizer in amount advantageously of at least 0.1% by weight, preferably of at least 1% by weight and advantageously of at most 10% by weight, preferably of at most 5% by weight based on the total weight of polymer (A) and polymer (B).

Plasticizers suitable for the thermoplastic fluoropolymer composition of the process of the invention may be chosen from the usual monomeric or polymeric plasticizers for fluoropolymers.

Plasticizers described in U.S. Pat. No. 3,541,039 (PENNWALT CORP.) 17 Nov. 1970 and those described in U.S. Pat. No. 4,584,215 (INST FRANCAIS DU PETROLE) 22 Apr. 1986 are suitable for use in the thermoplastic fluoropolymer compositions of the process of the invention.

The plasticizers are incorporated without any difficulty in the thermoplastic fluoropolymer compositions of the process of the invention and produce compositions whose impact strength, especially at low temperature, is advantageously improved. In other words, plasticizers can be advantageously used in the thermoplastic fluoropolymer compositions of the process of the invention to improve the low temperature behaviour of final parts made from said compositions, especially when these parts are submitted to extreme operating temperatures.

Among monomeric plasticizers, mention can be notably made of dibutyl sebacate (DBS), N-n-butylsulphonamide, acetyl-tri-n-butylcitrate of formula:

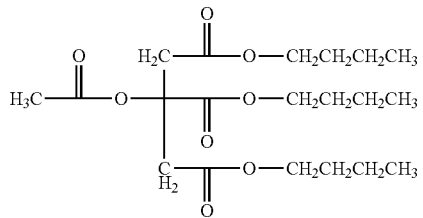

and dibutoxyethyladipate of formula:

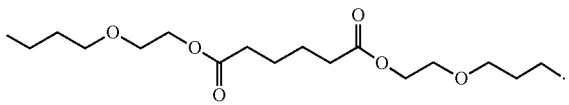

Among polymeric plasticizers, mention can be notably made of polymeric polyesters such as those derived from adipic, azelaic or sebacic acids and diols, and their mixtures, but on condition that their molecular mass is at least approximately 1500, preferably at least 1800, and not exceeding approximately 5000, preferably lower than 2500. Polyesters of excessively high molecular mass result, in fact, in compositions of lower impact strength.

A plasticizer which can be particularly advantageously used within the context of the process of the present invention is dibutyl sebacate ($C_4H_9$—OOC—$(CH_2)_8$—COO—$C_4H_9$).

Good results in terms of processability of the thermoplastic fluoropolymer composition of the process of the invention have been obtained with a thermoplastic fluoropolymer composition advantageously having a melt flow index (MFI) comprised between 0.5 g/10 min and 3.0 g/10 min, preferably between 1.5 g/10 min and 2.9 g/10 min, more preferably between 1.8 g/10 min and 2.8 g/10 min, as measured in accordance with ASTM D 1238 at 230° C. under a piston load of 10 Kg.

The thermoplastic fluoropolymer composition of the process of the invention preferably comprises:
(A) from 10% to 60% by weight, preferably from 25% to 55% by weight, more preferably from 30% to 40% by weight based on the total weight of polymer (A) and polymer (B) of at least one vinylidene fluoride (VDF) homopolymer [polymer (A)],
(B) from 40% to 90% by weight, preferably from 45% to 75% by weight, more preferably from 60% to 70% by weight based on the total weight of polymer (A) and polymer (B) of at least one VDF copolymer comprising from 2% to 15% by moles of recurring units derived from hexafluoropropylene (HFP) or chlorotrifluoroethylene (CTFE), and optionally, (C) at least one plasticizer.

Very good results have been obtained with a thermoplastic fluoropolymer composition as defined above, said composition further comprising at least one plasticizer.

The thermoplastic fluoropolymer composition of the process of the invention more preferably comprises:

(A) from 10% to 60% by weight, preferably from 25% to 55% by weight, more preferably from 30% to 40% by weight based on the total weight of polymer (A) and polymer (B) of at least one vinylidene fluoride (VDF) homopolymer [polymer (A)], (B) from 40% to 90% by weight, preferably from 45% to 75% by weight, more preferably from 60% to 70% by weight based on the total weight of polymer (A) and polymer (B) of at least one VDF copolymer comprising from 2% to 15% by moles of recurring units derived from hexafluoropropylene (HFP) or chlorotrifluoroethylene (CTFE), and (C) at least one plasticizer.

The thermoplastic fluoropolymer composition of the process of the invention even more preferably comprises:

(A) from 10% to 60% by weight, preferably from 25% to 55% by weight, more preferably from 30% to 40% by weight based on the total weight of polymer (A) and polymer (B) of at least one vinylidene fluoride (VDF) homopolymer [polymer (A)], said polymer (A) having an intrinsic viscosity comprised between 1.1 dl/g and 1.3 dl/g, preferably between 1.15 dl/g and 1.25 dl/g, (B) from 40% to 90% by weight, preferably from 45% to 75% by weight, more preferably from 60% to 70% by weight based on the total weight of polymer (A) and polymer (B) of at least one VDF copolymer comprising from 2% to 15% by moles of recurring units derived from hexafluoropropylene (HFP), said polymer (B) having an intrinsic viscosity comprised between 1.5 dl/g and 1.8 dl/g, preferably between 1.55 dl/g and 1.7 dl/g, and (C) at least one plasticizer.

The thermoplastic fluoropolymer composition of the process of the invention may further comprise at least one processing aid.

It has been found that one or more processing aids may be advantageously used in the process of the invention when the average intrinsic viscosity of polymer (A) and polymer (B) in the thermoplastic fluoropolymer composition of the process of the invention is higher than 1.3 dl/g.

Suitable examples of processing aids suitable for the thermoplastic fluoropolymer composition of the process of the invention include, notably, tetrafluoroethylene (TFE) homopolymers and copolymers.

Non-limitative examples of TFE copolymers suitable as processing aids in the thermoplastic fluoropolymer composition of the process of the invention include, notably, TFE copolymers comprising at least 2% by weight, preferably at least 7% by weight and at most 30% by weight, preferably at most 20% by weight, more preferably at most 13% by weight of recurring units derived from at least one fluorinated comonomer (F) chosen from the followings:

1. perfluoroalkylvinylethers of formula $CF_2=CFOR_{f1}'$, wherein $R_{f1}'$ is a $C_1$-$C_6$ perfluoroalkyl group, e.g. $CF_3$, $C_2F_5$, $C_3F_7$; and/or
2. perfluoro-oxyalkylvinylethers of formula $CF_2=CFOX_0$, wherein $X_0$ is a $C_1$-$C_{12}$ perfluorooxyalkyl group having one or more ether groups, e.g. perfluoro-2-propoxy-propyl group; and/or
3. $C_3$-$C_8$ perfluoroolefins such as hexafluoropropylene (HFP).

Good results have been obtained with TFE copolymers wherein the fluorinated comonomer (F) is a $C_3$-$C_8$ perfluoroolefin and/or a perfluoroalkylvinylether as defined above. Particularly good results have been achieved with TFE copolymers wherein the fluorinated comonomer (F) is hexafluoropropylene (HFP) and/or perfluoromethylvinylether (PMVE) of formula $CF_2=CFOCF_3$.

Should the processing aid be a TFE copolymer wherein the fluorinated comonomer (F) is a perfluoroalkylvinylether as defined above, said TFE copolymer typically has a dynamic viscosity at a shear rate of 1 $s^{-1}$ of advantageously at most 100 Pa×sec, preferably of at most 50 Pa×sec, more preferably of at most 30 Pa×sec, most preferably of at most 10 Pa×sec at a temperature of 280° C.

Dynamic viscosity is typically measured with a controlled strain rheometer, employing an actuator to apply a deforming strain to the sample and a separate transducer to measure the resultant stress developed within the sample, using the parallel plate fixture.

The processing aid is preferably a tetrafluoroethylene (TFE)/perfluoromethylvinylether (PMVE) copolymer as described in WO 2007/122217 (SOLVAY SOLEXIS S.P.A.) 1 Nov. 2007.

The thermoplastic fluoropolymer composition of the process of the invention is typically prepared by any of the usual techniques, preferably by mixing the components in the form of powders or granules.

In step (i) of the process of the invention, the thermoplastic fluoropolymer composition is typically processed by extrusion, injection moulding, sheathing and the like.

In step (ii) of the process of the invention, the pipe liner is typically deformed by reducing its cross-sectional area.

The Applicant has found that the pipe liner of the process of the invention is successfully endowed with a combination of mechanical properties which enable it to be advantageously temporarily elastically deformed.

To the purpose of the present invention, a temporarily elastic deformation is to be distinguished from a permanent plastic deformation.

For the pipe liner to be temporarily elastically deformed, the strain imposed to the pipe liner is typically lower than the yield strain of the composition forming the pipe liner. The expansion of the deformed pipe liner is thus commonly obtained by recovery of its elastic deformation.

Techniques for reducing the cross-sectional area of a pipe liner to enable it to be installed in a pipeline are well known in the art.

According to one type of technique, the so-called Roll Down process, the cross-sectional area of the pipe liner is reduced by means of radial compression typically using sets of compression rollers. The compressive strains imposed on the pipe wall by this process are typically of up to about 20%.

According to another type of technique, the cross-sectional area of the pipe liner is reduced by means of axial compression typically pulling the pipe liner through a diameter reducing die. The diameter reduction is only achieved so long as the axial tension on the pipe is maintained. The compressive strains involved are typically of about 10% to 15%. Non-limitative examples of this type of process are the techniques known as Swagelining, Die-drawing and Titeliner.

Yet, according to another type of technique, the cross-sectional area of the pipe liner is deformed by folding or collapsing the pipe liner to a U-shaped or C-shaped cross section. The pipe liner so obtained can be introduced into the bore of a pipeline and then expanded to its original cross section.

In step (ii) of the process of the invention, the pipe liner is preferably deformed by reducing its cross-sectional area by means of radial or axial compression.

In step (iii) of the process of the invention, the deformed pipe liner is expanded to fit with the inner diameter of the pipeline typically by elastic recovery.

The deformed pipe liner may be also expanded by heat and/or pressurisation with oils and gases.

The Applicant has found that the thermoplastic fluoropolymer composition of the process of the invention advantageously enables obtaining pipe liners which successfully exhibit elastic recovery rate values suitable for lining metal pipelines commonly conveying oils and gas, the pipe liners so obtained being also resistant to heat and pressure and to harsh chemical environments.

According to a preferred embodiment of the process of the invention, said process comprises the following steps:

(i) processing a thermoplastic fluoropolymer composition to yield a pipe liner having an outer diameter greater than the inner diameter of said metal pipeline, said thermoplastic fluoropolymer composition comprising:

(A) from 10% to 60% by weight, preferably from 25% to 55% by weight, more preferably from 30% to 40% by weight based on the total weight of polymer (A) and polymer (B) of at least one vinylidene fluoride (VDF) homopolymer [polymer (A)], (B) from 40% to 90% by weight, preferably from 45% to 75% by weight, more preferably from 60% to 70% by weight based on the total weight of polymer (A) and polymer (B) of at least one VDF copolymer comprising from 2% to 15% by moles of recurring units derived from hexafluoropropylene (HFP), and (C) from 0.1% to 10% by weight, preferably from 1% to 5% by weight based on the total weight of polymer (A) and polymer (B) of at least one plasticizer;

(ii) deforming said pipe liner by means of radial or axial compression to yield a deformed pipe liner having an outer diameter smaller than the inner diameter of said metal pipeline;

(iii) introducing the deformed pipe liner in said metal pipeline; and (iv) expanding the deformed pipe liner to fit with the inner diameter of said metal pipeline.

Another object of the present invention is a pipeline system comprising at least two coaxial pipes:
an outer metal pipe, and
an inner pipe made of a thermoplastic fluoropolymer composition comprising:

(A) from 10% to 60% by weight, preferably from 25% to 55% by weight, more preferably from 30% to 40% by weight based on the total weight of polymer (A) and polymer (B) of at least one vinylidene fluoride (VDF) homopolymer [polymer (A)], (B) from 40% to 90% by weight, preferably from 45% to 75% by weight, more preferably from 60% to 70% by weight based on the total weight of polymer (A) and polymer (B) of at least one VDF copolymer comprising from 2% to 15% by moles of recurring units derived from at least one other fluorinated comonomer (F) [polymer (B)], and (C) at least one plasticizer.

The polymer (A), the polymer (B) and the plasticizer (C) of the thermoplastic fluoropolymer composition of the pipeline system of the invention are defined as above.

The Applicant has found that the inner pipe of the pipeline system of the invention successfully enables protecting from corrosion metal pipes commonly conveying hydrocarbons at temperatures of up to 130° C. or more, such as on-shore and off-shore oil and gas metal pipes.

The pipeline system preferably comprises two coaxial pipes, wherein the outer diameter of the inner pipe fits with the inner diameter of the metal pipe.

The pipeline system more preferably consists of two coaxial pipes, wherein the outer diameter of the inner pipe fits with the inner diameter of the metal pipe.

The metal pipe is usually an iron or steel pipe, preferably a steel pipe, more preferably a carbon, alloy or stainless steel pipe.

The pipeline system of the invention preferably consists of two coaxial pipes:
an outer steel pipe, and
an inner pipe made of a thermoplastic fluoropolymer composition comprising:

(A) from 10% to 60% by weight, preferably from 25% to 55% by weight, more preferably from 30% to 40% by weight based on the total weight of polymer (A) and polymer (B) of at least one vinylidene fluoride (VDF) homopolymer [polymer (A)], said polymer (A) having an intrinsic viscosity comprised between 1.1 dl/g and 1.3 dl/g, preferably between 1.15 dl/g and 1.25 dl/g, (B) from 40% to 90% by weight, preferably from 45% to 75% by weight, more preferably from 60% to 70% by weight based on the total weight of polymer (A) and polymer (B) of at least one VDF copolymer comprising from 2% to 15% by moles of recurring units derived from hexafluoropropylene (HFP) or chlorotrifluoroethylene (CTFE), said polymer (B) having an intrinsic viscosity comprised between 1.5 dl/g and 1.8 dl/g, preferably between 1.55 dl/g and 1.7 dl/g, and (C) at least one plasticizer,
wherein the outer diameter of the inner pipe fits with the inner diameter of the steel pipe.

The pipeline system of the invention more preferably consists of two coaxial pipes:
an outer steel pipe, and
an inner pipe made of a thermoplastic fluoropolymer composition comprising:

(A) from 10% to 60% by weight, preferably from 25% to 55% by weight, more preferably from 30% to 40% by weight based on the total weight of polymer (A) and polymer (B) of at least one vinylidene fluoride (VDF) homopolymer [polymer (A)], said polymer (A) having an intrinsic viscosity comprised between 1.1 dl/g and 1.3 dl/g, preferably between 1.15 dl/g and 1.25 dl/g, (B) from 40% to 90% by weight, preferably from 45% to 75% by weight, more preferably from 60% to 70% by weight based on the total weight of polymer (A) and polymer (B) of at least one VDF copolymer comprising from 2% to 15% by moles of recurring units derived from hexafluoropropylene (HFP), said polymer (B) having an intrinsic viscosity comprised between 1.5 dl/g and 1.8 dl/g, preferably between 1.55 dl/g and 1.7 dl/g, and (C) at least one plasticizer,
wherein the outer diameter of the inner pipe fits with the inner diameter of the steel pipe.

The thermoplastic fluoropolymer composition of the inner pipe of the pipeline system of the invention advantageously has a melt flow index (MFI) comprised between 0.5 g/10 min and 3.0 g/10 min, preferably between 1.5 g/10 min and 2.9 g/10 min, more preferably between 1.8 g/10 min and 2.8 g/10 min, as measured in accordance with ASTM D 1238 at 230° C. under a piston load of 10 Kg.

The thermoplastic fluoropolymer composition of the inner pipe of the pipeline system of the invention may further comprise at least one processing aid as defined above.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

SOLEF® 6012 VDF homopolymer.

SOLEF® 1015 VDF homopolymer.

VDF/HFP copolymer comprising 7.5% by moles of HFP and having a melt flow index of 4.4 g/10 min as measured according to ASTM D1238 (230° C., 21.6 Kg) [polymer (B1)].

VDF/CTFE copolymer comprising 8.8% by moles of CTFE and having a melt flow index of 5.0 g/10 min as measured according to ASTM D1238 (230° C., 2.16 Kg) [polymer (B2)].

Determination of Tensile Properties

Pipe liners were extruded using a Battenfeld single screw extruder from a thermoplastic fluoropolymer composition, said pipe liners having an outer diameter of 90 mm and a thickness of about 5 mm. Tensile properties of test specimens 1BA prepared in accordance with ISO 527-2 obtained from said pipe liners were measured in accordance with ISO 527-2 and are reported in Table 1 here below.

Determination of Elastic Recovery by Hysteresis Tests

Stress-strain hysteresis cycles were measured on test specimens at 23° C. under a solicitation speed of 80 mm/min with a maximum strain applied of 8%. Maximum stress load applied and residual strain of the maximum strain applied after 15 minutes were measured. See Table 2 here below.

EXAMPLE 1

A pipe liner was extruded from a thermoplastic fluoropolymer composition prepared by mixing the following components in the form of powders:

32% by weight of SOLEF® 6012 VDF homopolymer,
65% by weight of polymer (B1), and
3% by weight of dibutyl sebacate.

EXAMPLE 2

A pipe liner was extruded from a thermoplastic fluoropolymer composition prepared by mixing the following components in the form of powders:

33% by weight of SOLEF® 6012 VDF homopolymer,
67% by weight of polymer (B1).

COMPARATIVE EXAMPLE 1

A pipe liner was extruded from a thermoplastic fluoropolymer composition prepared by mixing the following components in the form of powders:

65% by weight of SOLEF® 1015 VDF homopolymer,
30% by weight of polymer (B1), and
2.5% by weight of dibutyl sebacate,
2.5% by weight of a TFE/PMVE copolymer processing aid as described in Example 1a) of WO 2007/122217 (SOLVAY SOLEXIS S.P.A.) 1 Nov. 2007.

COMPARATIVE EXAMPLE 2

A pipe liner was extruded from a thermoplastic fluoropolymer composition prepared by mixing the following components in the form of powders:

67% by weight of SOLEF® 1015 VDF homopolymer,
33% by weight of polymer (B2).

It has been demonstrated that pipe liners obtained by processing thermoplastic fluoropolymer compositions according to the process of the invention are endowed with mechanical properties which enable them to be advantageously used in the process of the invention.

As shown in Table 1 here below, the pipe liners obtained by processing the thermoplastic fluoropolymer compositions according to Examples 1 and 2 of the invention are endowed with yield strain values such that the pipe liners so obtained advantageously undergo a temporary elastic deformation. Very good results have been obtained with pipe liners obtained by processing a thermoplastic fluoropolymer composition according to Example 1 of the invention, said composition further comprising a plasticizer.

On the other hand, the pipe liners obtained by processing the thermoplastic fluoropolymer compositions according to comparative Examples 1 and 2, wherein the weight ratio of polymer (A) to polymer (B) is outside the range of from 10:90 to 60:40, are endowed with yield strain values such that the pipe liners so obtained undergo a permanent plastic deformation.

TABLE 1

|  | Yield strain [%] |
|---|---|
| Example 1 | 20.8 |
| Example 2 | 14.1 |
| C. Example 1 | 10.0 |
| C. Example 2 | 7.0 |

It has been also demonstrated, as shown in Table 2 here below, that pipe liners obtained by processing the thermoplastic fluoropolymer compositions according to Examples 1 and 2 of the invention advantageously require, at 8% maximum strain applied, lower stress loads as compared with pipe liners obtained by processing the thermoplastic fluoropolymer compositions obtained according to comparative Examples 1 and 2.

Further, as shown by residual strain values after 15 minutes, the pipe liners obtained by processing the thermoplastic fluoropolymer compositions according to Examples 1 and 2 of the invention advantageously exhibit higher residual strain values after 15 minutes and thus lower elastic recovery rates as compared with the pipe liners obtained by processing the thermoplastic fluoropolymer compositions obtained according to comparative Examples 1 and 2 (see Table 2 here below).

Very good results have been obtained with pipe liners obtained by processing a thermoplastic fluoropolymer composition according to Example 1 of the invention, said composition further comprising a plasticizer.

TABLE 2

|  | Maximum stress [MPa] | Residual strain after 15 min [%] |
|---|---|---|
| Example 1 | 20.1 | 1.36 |
| Example 2 | 26.0 | 1.14 |

TABLE 2-continued

|  | Maximum stress [MPa] | Residual strain after 15 min [%] |
|---|---|---|
| C. Example 1 | 29.6 | 0.90 |
| C. Example 2 | 37.0 | 0.68 |

In view of the above, it has been found that the pipe liners made of the composition of the process of the invention are endowed with mechanical properties and chemical resistance properties that make them suitable for successfully lining oil and gas metal pipelines.

The invention claimed is:

1. A process for lining a metal pipeline, said process comprising the following steps:
  (i) processing a thermoplastic fluoropolymer composition to yield a pipe liner having an outer diameter greater than the inner diameter of said metal pipeline, said thermoplastic fluoropolymer composition comprising:
    (A) from 10% to 60% by weight, based on the total weight of polymer A and polymer B, of at least one polymer A, wherein polymer A is a vinylidene fluoride (VDF) homopolymer,
    (B) from 40% to 90% by weight, based on the total weight of polymer A and polymer B, of at least one polymer B, wherein polymer B is a VDF copolymer comprising from 2% to 15% by moles of recurring units derived from at least one other fluorinated comonomer F, and optionally, (C) at least one plasticizer;
  (ii) deforming said pipe liner to yield a deformed pipe liner having an outer diameter smaller than the inner diameter of said metal pipeline;
  (iii) introducing the deformed pipe liner in said metal pipeline; and
  (iv) expanding the deformed pipe liner to fit with the inner diameter of said metal pipeline.

2. The process of claim 1, wherein polymer A has an intrinsic viscosity of between 0.9 dl/g and 2.0 dl/g.

3. The process of claim 1, wherein polymer B has an intrinsic viscosity of between 0.9 dl/g and 2.0 dl/g.

4. The process of claim 1, wherein polymer B of the thermoplastic fluoropolymer composition is a VDF copolymer comprising from 2% to 15% by moles of recurring units derived from hexafluoropropylene (HFP) and/or chlorotrifluoroethylene (CTFE).

5. The process of claim 4, wherein polymer B of the thermoplastic fluoropolymer composition is a VDF copolymer comprising from 2% to 15% by moles of recurring units derived from hexafluoropropylene (HFP).

6. The process of claim 1, wherein the thermoplastic fluoropolymer composition comprises at least one plasticizer in an amount of at least 0.1% by weight, and of at most 10% by weight based on the total weight of polymer A and polymer B.

7. The process of claim 6, wherein the plasticizer of the thermoplastic fluoropolymer composition is dibutyl sebacate.

8. The process of claim 1, wherein in step (ii) the pipe liner is deformed by reducing its cross-sectional area by means of radial or axial compression.

9. The process of claim 1, wherein the thermoplastic fluoropolymer composition comprises between 25% and 55% by weight of polymer A and between 45% and 75% by weight of polymer B, based on the total weight of polymer A and polymer B.

10. The process of claim 1, wherein the thermoplastic fluoropolymer composition comprises between 30% and 40% by weight of polymer A and between 60% and 70% by weight of polymer B, based on the total weight of polymer A and polymer B.

11. The process of claim 1, wherein polymer A has an intrinsic viscosity between 1.1 dl/g and 1.3 dl/g and polymer B has an intrinsic viscosity between 1.5 dl/g and 1.8 dl/g.

12. The process of claim 1, wherein the thermoplastic fluoropolymer composition comprises at least one plasticizer in amount between 1% and 5% by weight, based on the total weight of polymer A and polymer B.

13. A pipeline system comprising at least two coaxial pipes:
  an outer metal pipe, and
  an inner pipe made of a thermoplastic fluoropolymer composition comprising:
    (A) from 10% to 60% by weight, based on the total weight of polymer A and polymer B, of at least one polymer A, wherein polymer A is a vinylidene fluoride (VDF) homopolymer,
    (B) from 40% to 90% by weight, based on the total weight of polymer A and polymer B, of at least one polymer B, wherein polymer B is a VDF copolymer comprising from 2% to 15% by moles of recurring units derived from at least one other fluorinated comonomer F, and
    (C) at least one plasticizer.

14. The pipeline system of claim 13, consisting of two coaxial pipes wherein the outer diameter of the inner pipe fits with the inner diameter of the metal pipe.

15. The pipeline system of claim 13, consisting of two coaxial pipes:
  an outer steel pipe, and
  an inner pipe made of a thermoplastic fluoropolymer composition comprising:
    (A) from 10% to 60% by weight, based on the total weight of polymer A and polymer B, of at least one polymer A, wherein polymer A is a vinylidene fluoride (VDF) homopolymer, said polymer A having an intrinsic viscosity comprised between 1.1 dl/g and 1.3 dl/g,
    (B) from 40% to 90% by weight, based on the total weight of polymer A and polymer B, of at least one polymer B, wherein polymer B is a VDF copolymer comprising from 2% to 15% by moles of recurring units derived from hexafluoropropylene (HFP) or chlorotrifluoroethylene (CTFE), said polymer B having an intrinsic viscosity comprised between 1.5 dl/g and 1.8 dl/g, and
    (C) at least one plasticizer,
  wherein the outer diameter of the inner pipe fits with the inner diameter of the steel pipe.

16. The pipeline system of claim 15, wherein the thermoplastic fluoropolymer composition comprises between 25% and 55% by weight of polymer A and between 45% and 75% by weight of polymer B, based on the total weight of polymer A and polymer B.

17. The pipeline system of claim 15, wherein the thermoplastic fluoropolymer composition comprises between 30% and 40% by weight of polymer A and between 60% and 70% by weight of polymer B, based on the total weight of polymer A and polymer B.

18. The pipeline system of claim 17, wherein polymer A has an intrinsic viscosity between 1.15 dl/g and 1.25 dl/g.

19. The pipeline system of claim 17, wherein polymer B has an intrinsic viscosity between 1.55 dl/g and 1.7 dl/g.

20. The pipeline system of claim 15, wherein the thermoplastic fluoropolymer composition comprises at least one plasticizer in amount between 1% and 5% by weight, based on the total weight of polymer A and polymer B.

* * * * *